US007584265B2

(12) United States Patent
Dickerman et al.

(10) Patent No.: US 7,584,265 B2
(45) Date of Patent: *Sep. 1, 2009

(54) INSTANT MESSAGING SESSION INVITE FOR ARRANGING PEER-TO-PEER COMMUNICATION BETWEEN APPLICATIONS

(75) Inventors: Howard J. Dickerman, Bellevue, WA (US); Benjamin A. Mejia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/751,556

(22) Filed: May 21, 2007

(65) Prior Publication Data

US 2007/0220156 A1    Sep. 20, 2007

Related U.S. Application Data

(63) Continuation of application No. 10/172,716, filed on Jun. 14, 2002, now Pat. No. 7,233,979.

(60) Provisional application No. 60/363,985, filed on Mar. 14, 2002.

(51) Int. Cl.
*G06F 15/16* (2006.01)

(52) U.S. Cl. ...................... 709/217; 709/212; 709/204; 709/216

(58) Field of Classification Search ................. 709/203, 709/206, 228, 218, 204, 212, 216, 217
See application file for complete search history.

(56) References Cited

U.S. PATENT DOCUMENTS

| 6,594,819 | B1 * | 7/2003 | Ciarlante et al. ............ 717/177 |
| 2002/0188657 | A1 | 12/2002 | Traversat et al. |
| 2003/0018725 | A1 | 1/2003 | Turner et al. |
| 2003/0105812 | A1 | 6/2003 | Flowers, Jr. et al. |
| 2003/0229522 | A1 | 12/2003 | Thompson et al. |

OTHER PUBLICATIONS

Microsoft Corporation, "Messenger Service API References", Mar. 23, 2001, 103 pages.

* cited by examiner

*Primary Examiner*—William C Vaughn, Jr.
*Assistant Examiner*—Djenane M Bayard
(74) *Attorney, Agent, or Firm*—Lee & Hayes, PLLC

(57) ABSTRACT

Arrangements and procedures for arranging peer-to-peer communications sessions between applications are described. In one implementation, a first application executing at a first device utilizes online presence information of an instant messaging service to select a second application with which to engage in the peer-to-peer session. The second application is associated with a second device and registered with the instant messaging service as being peer-to-peer session invite capable. The first application arranges the peer-to-peer session via components of the instant messaging service. The arranged peer-to-peer session is functionally independent of the instant messaging service.

17 Claims, 5 Drawing Sheets

INSTANT MESSAGING SESSION INVITE FOR ARRANGING PEER-TO-PEER COMMUNICATION BETWEEN APPLICATIONS

RELATED APPLICATIONS

This non-provisional U.S. patent application is a continuation of and claims the benefit of priority to U.S. patent application Ser. No. 10/172,716, filed on Jun. 14, 2002, the disclosure of which is incorporated by reference herein. Furthermore, this non-provisional U.S. patent application claims the benefit of priority to provisional U.S. patent application Ser. No. 60/363,985, which was filed on Mar. 14, 2002, the disclosure of which is incorporated by reference herein. U.S. patent application Ser. No. 10/172,716 claimed the benefit of priority of and was converted from provisional U.S. patent application Ser. No. 60/363,985.

TECHNICAL FIELD

The following description pertains to the arrangement of peer-to-peer communication sessions between networked applications.

BACKGROUND

A peer-to-peer network is a type of network in which each workstation has substantially equivalent capabilities and responsibilities. This differs from client/server architectures, in which some computers are dedicated to serving the others. A peer-to-peer session consists of two or more of users or applications connected to one-another over a network. A peer-to-peer session can be established in a number of conventional ways including, for example, by hardwiring specific communication details (e.g., network addresses and protocols) into clients and/or adding complex specialized lobby support code into a client to obtain necessary communication implementation details from a proprietary third party server. Thus, direct peer-to-peer session establishment generally requires each session client to be specifically designed to communicate with the other session client(s) based on each respective client's specific communication implementation details.

Such rigid design requirements typically result in applications that are not very robust or easily ported across platforms or implementations. For instance, hardwiring a particular network address into an application is not a very robust technique to communicate with another device since the network address used to access the device may change if the device is moved to a domain using a Network Address Translators (NATs) that multiplexes a single IP address across multiple machines.

To avoid hardwiring communication specifics such as network addresses and protocols into applications, conventional peer-to-peer session arrangement techniques allow a client to arrange a peer-to-peer session with another client using "lobby support". Lobby support's primary purpose is to enable users to meet and exchange network connection information to establish peer-to-peer sessions. Unfortunately, enabling application lobby support is substantially burdensome for application developers that desire to use lobby support to arrange peer-to-peer sessions because a considerable amount of dedicated lobby support code (e.g., the Direct-Play®, ActiveX® libraries, and/or the like) must be implemented in each application. Such implementation requirements are time consuming and typically result in an undesirable increase in code size and code complexity.

Moreover, lobby support implementations are substantially burdensome because application developers or a third party are/is also required to implement a lobby support infrastructure. The lobby support infrastructure includes a non-generic lobby server to interface with specialized lobby support client code to communicate device communication specifics. Additionally, another specialized client based piece code must be developed, loaded, and installed on each client device to communicate with the lobby server—using whatever protocols are appropriate. Each of these respective tasks is substantially daunting in itself.

Accordingly, conventional techniques to arrange peer-to-peer sessions are considerably problematic in that they either involve rigid design requirements that hardwire communication specifics into application code, or require considerable specialized lobby support code in an application along with $3^{rd}$ party development efforts to generate a server communication infrastructure.

These and other limitations of traditional systems and procedures to establish peer-to-peer communication sessions between various applications are addressed by the following described arrangements and procedures.

SUMMARY

Arrangements and procedures for arranging peer-to-peer communications sessions between applications are described. In one implementation, a first application executing at a first device utilizes online presence information of an instant messaging service to select a second application with which to engage in the peer-to-peer session. The second application is associated with a second device and registered with the instant messaging service as being peer-to-peer session invite capable. The first application arranges the peer-to-peer session via components of the instant messaging service. The arranged peer-to-peer session is functionally independent of the instant messaging service.

BRIEF DESCRIPTION OF THE DRAWINGS

The same numbers are used throughout the drawings to reference like features and components.

FIG. 4 illustrates shows how an invitee device accepts or declines a peer-to-peer session invitation.

DETAILED DESCRIPTION

The following description sets forth exemplary subject matter to arrange peer-to-peer communication between networked applications via an instant messaging system. The subject matter is described with specificity to meet statutory requirements. However, the description itself is not intended to limit the scope of this patent.

An Exemplary System

Figure 1:
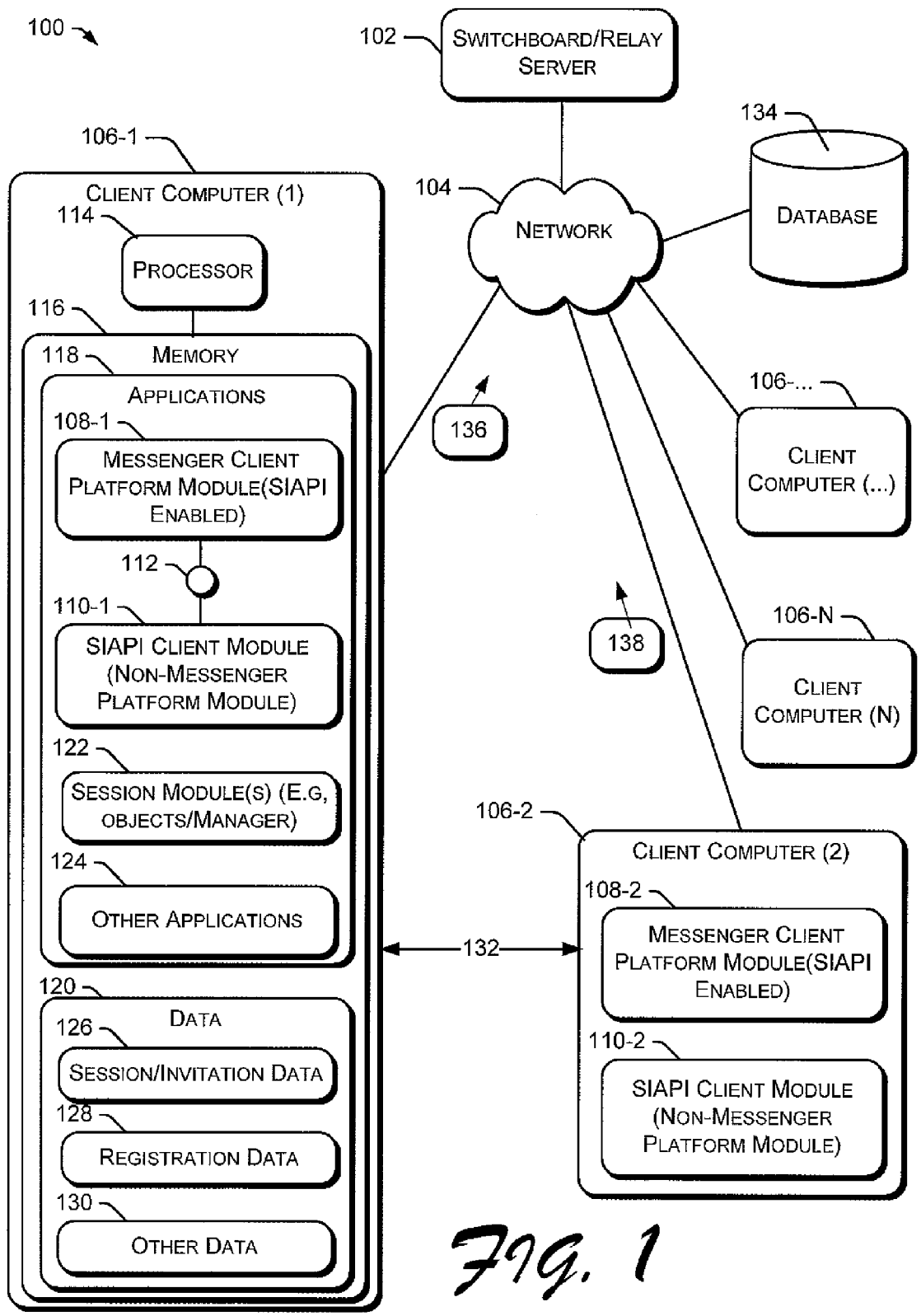
FIG. 1 shows an exemplary system using an instant messaging service to arrange a peer-to-peer communication session between networked applications.

FIG. 1 shows an exemplary system 100 to programmatically arrange peer-to-peer sessions between networked applications. In particular, system 100 provides a lightweight session invite (SI) API that leverages communication and user online presence aspects of an instant messaging system (e.g., WINDOWS® Messenger system of Microsoft Corporation of Redmond, Wash., Yahoo! Messenger, AOL instant messenger (AIM), and the like) to arrange peer-to-peer sessions between disparate applications. Such presence information indicates whether an entity such as a user is available for engaging in a peer-to-peer session with another entity. A user provides presence information to the instant messaging service by logging onto an instant messaging client platform executing at a computing device. Hereinafter, a peer-to-peer communication session is often referred to as a secondary out-of-band communication session, a multi-point session, and the like.

The system 100 includes a switchboard or relay server 102 executing an instant messaging system. The relay server 102 is coupled across a network 104 (e.g., an organizational intranet or the Internet) to one or more client computing devices 106-1, 106-2, 106-..., and 106-N. The relay server 102 is a contact point for all computing devices 106. More particularly, the relay server 102 is a contact point for instant messenger client platform applications 108 and/or client modules 110 (e.g., a word processor, a spreadsheet, a graphics program, a multimedia application, and so on—the types of client modules 110 are virtually unlimited), which are hosted by respective client devices 106. The relay server 102 dispatches online presence and communication specifics such as direct session connection context data (e.g., network addresses and protocol information) between such applications.

The combination of services provided by the relay server 102 and the messenger client platform applications 108 provide the instant messaging service of the system 100. The client modules 110 leverage a session invite (SI) application programming interface (API) 112 (e.g., SIAPIs 112-1 and 112-2) exposed by respective messenger platform applications 108 to programmatically arrange peer-to-peer communications.

A client device 106 includes a processor 114 that is coupled to a system memory 116. Each client device 106 is operational as any one of a number of different computing devices such as a personal computer, an image server computer, a thin client, a thick client, a hand-held or laptop device, a multi-processor system, a microprocessor-based system, a set top box, programmable consumer electronics, a wireless phone, an application specific integrated circuit (ASIC), a network PC, minicomputer, mainframe computer, and so on.

The system memory 116 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and so on.

The processor 114 is configured to fetch and execute computer program instructions from program modules 118 or applications portion of memory 116, and further configured to fetch data from the data 120 portion of system memory 116 while executing program modules 118. Program modules 118 typically include routines, programs, objects, components, and so on, for performing particular tasks or implementing particular abstract data types. In this implementation, program modules 118 include, for example, an instant messaging client platform module 108, an SIAPI enabled module 110, a session module 122, and other applications 124 such as an operating system (OS), Web browser, etc. Data 120 includes, for example, session/invitation data 126, registration data 128, and other data 125 such as device and application configuration data, messages, etc. Aspects of each these program modules 118 and data 120 are now described in greater detail.

Messenger client platform module 108 provides real-time communication messaging services between respective clients 106. Such communication services include transmitting notifications (e.g., client 106 online presence or status and messages) to clients 106 in a scalable fashion such as within an organizational intranet and/or across a loosely coupled or federated constellation of servers 102. Each platform module 108 exposes a number of SIAPI interfaces 112 to enable two networked client programs (e.g., messenger platform clients 108 and/or non-messenger platform clients 110) to programmatically arrange peer-to-peer sessions. Virtually any type of application 110 (e.g., word processing, e-mail, image processing, etc.) can implement SIAPI 112 to arrange a peer-to-peer session over the instant messaging capabilities of system 100.

Such a peer-to-peer session is illustrated as communication path 132, which may or may not be bi-directional in nature. Depending on the details of the arranged session, an established peer-to-peer session may pass through network 104. Additionally, although a peer-to-peer session may be arranged through the network 104, the session itself may not pass through the network if the devices 106 participating in the session (represented by path 132) are otherwise coupled together (e.g., through a serial or parallel interface, an infrared connection, and so on). Thus, although peer-to-peer communication path 132 and others (e.g., those described in greater detail below in reference to FIG. 2) are illustrated as bypassing network 104, this exemplary communication path is shown only for purposes of clearly pointing out that a peer-to-peer session does not need to rely on the switchboard server after the peer-to-peer session has been arranged.

The SIAPI 112 is essentially a platform that is built on top of instant messaging aspects of messaging client platform module 108. The SIAPI 112 leverages instant messaging presence information corresponding to other instant messaging modules 108 on other clients devices 106 to exchange client 106 specific communication details (e.g., network addresses, communication protocols, and so on) and/or other application 108 and 110 defined data 120 between devices 106.

For example, instant messaging module 108-1 (or another SIAPI enabled application 110-1) leverages presence information corresponding to messaging module 108-2 on client 106-2 to arrange a peer-to-peer communication session with either the messaging application 108-2 or between other respective SIAPI enabled applications 110-1 and 110-2. To accomplish this, the SIAPI enabled messaging module 108 publishes or exposes SIAPI 112 for access by other applications 108 and/or 110.

The exposed SIAPI 112 provides a programmatic interface for other applications to leverage data sending capabilities of the messaging application 108 to send data from one device 106 to another device 106 so that the client application 110 (e.g., 110-1) may initiate a peer-to-peer or other session (e.g., an application sharing session, a remote assistance session, and so on) with another client application 110 (e.g., 110-2). The other client application, in this example, is not required to use or otherwise involve the messaging application 108 or the switchboard server 102 to participate in such a peer-to-peer session arrangement.

Although FIG. 1 illustrates system 100 in a client/server based architecture, the peer-to-peer session arranging aspects of the system 100 are also applicable to other computing system architectures such as peer-to-peer system, multi-point system, and other computing system architectures.

An Exemplary Session Invite API

SIAPI 112 is exposed by messenger platform 108. Messenger platforms 108 and/or other applications 110 utilize SIAPI 112 to access the SI capability of the messaging service (e.g., messaging platforms 108 in combination with a relay server 102) and to thereby establish respective peer-to-peer sessions with other instant messaging enabled applications. In one implementation, messenger platform 108 is based on an object-oriented programming model such as the Component Object Model (COM).

TABLE 1 illustrates an exemplary SIAPI 112 interfaces.

TABLE 1

AN EXEMPLARY SESSION INVITE API

```
// IMsgrSessionManager Interface
    [
        uuid(305D86C6-6896-4099-91F5-CB7BA7733563), //
IID__IMsgrSessionManager
        helpstring("Messenger Session Manager Interface"),
        dual,
        oleautomation
    ]
    interface IMsgrSessionManager : IDispatch
    {
        [id(0),
            helpstring("Create a new Session object."), helpcontext(0)]
            HRESULT CreateSession(
                [out, retval] IDispatch **ppSession);
            [id(1),
            helpstring("Retrieves the session which launched
the application."), helpcontext(0)]
            HRESULT GetLaunchingSession(
                [in] LONG lProcessID,
                [out, retval] IDispatch **ppSession);
            [id(2),
                helpstring("Register an app for use with Session
Manager."), helpcontext(0)]
            HRESULT RegisterApplication(
                [in] BSTR bstrAppGUID,
                [in] BSTR bstrAppName,
                [in] BSTR bstrAppURL,
                [in] BSTR bstrPath,
                [in] LONG ulFlags);
            [id(3),
                helpstring("Remove an app from the list."),
                helpcontext(0)]
            HRESULT UnRegisterApplication(
                [in] BSTR bstrAppGUID);
            [propget,
                id(4),
                helpstring("Get the collection of applications."),
helpcontext(0)]
            HRESULT Applications(
                [out, retval] IDispatch **ppDisp);
    }
    // DMsgrSessionManagerEvents Interface
    [
        uuid(52AC8B62-8F88-46ca-902A-1F1166B0A9F4),    //
DIID__DMsgrSessionManagerEvents
        helpstring("Messenger Events for Session Manager
Interface") ]
```

TABLE 1-continued

AN EXEMPLARY SESSION INVITE API

```
    dispinterface DMsgrSessionManagerEvents
    {
        properties:
        methods:
            [id(DISPID__ONINVITATION),
            helpstring("A new session invitation has been received."),
            helpcontext(0)]
            void OnInvitation(
                [in] IDispatch *pSession,
                [in] BSTR bstrAppData,
                [in, out] VARIANT__BOOL *pfHandled);
            [id(DISPID__ONAPPREGISTERED),
                helpstring("A new application has been
                registered."),
helpcontext(0)]
            void OnAppRegistered(
                [in] BSTR bstrAppGUID);
            [id(DISPID__ONAPPUNREGISTERED),
                helpstring("An application has been unregistered."),
helpcontext(0)]
            void OnAppUnRegistered(
                [in] BSTR bstrAppGUID);
            [id(DISPID__ONLOCKCHALLENGE),
helpstring("Challenge from server received."), helpcontext(0x0000)]
            void OnLockChallenge(
                [in] long lCookie,
                [in] BSTR bstrChallenge );
            [id(DISPID__ONLOCKRESULT), helpstring("Result
from server lock and key service."), helpcontext(0x0000)]
            void OnLockResult(
                [in] long lCookie,
                [in] VARIANT__BOOL fSucceed);
            [id(DISPID__ONLOCKENABLE),
                helpstring("Enable/disable
lock and key."), helpcontext(0x0000)]
            void OnLockEnable(
                [in] VARIANT__BOOL fEnable);
            [id(DISPID__ONAPPSHUTDOWN),
                helpstring("Messenger
is shutting down."), helpcontext(0x0000)]
            void OnAppShutdown( );
    }
//------------------------------------------------------------
// IMsgrSession Interface
    [
        uuid(42D7CAFC-0167-4941-A5D8-9FD7F104C41A),    //
IID__IMsgrSession
        helpstring("Messenger Session Interface"),
        oleautomation,
        dual
    ]
    interface IMsgrSession : IDispatch
    {
        [propget,
            id(0),
        helpstring("Obtains the application GUID set by the inviter for
this session."), helpcontext(0)]
        HRESULT Application(
            [out, retval] BSTR *pbstrAppGUID);
        [propput,
            id(0),
            helpstring("Sets the application GUID for the session."),
helpcontext(0)]
        HRESULT Application(
            [in] BSTR bstrAppGUID);
        [propget,
            id(1),
            helpstring("Gets the current state of the session."),
helpcontext(0)]
        HRESULT State(
            [out, retval] SESSION__STATE *pState);
        [id(2),
            helpstring("Invites user to this session."),
            helpcontext(0)]
        HRESULT Invite(
            [in] IDispatch *pUser,
            [in] BSTR bstrAppData);
```

TABLE 1-continued

AN EXEMPLARY SESSION INVITE API

```
            [id(3),
                helpstring("Decline an invitation."), helpcontext(0)]
            HRESULT Decline(
                [in] BSTR bstrAppData);
            [id(4),
                helpstring("Cancel an invitation."), helpcontext(0)]
            HRESULT Cancel(
                [in] long hr,
                [in] BSTR bstrAppData);
            [id(5),
                helpstring("Accept an invitation."), helpcontext(0)]
            HRESULT Accept(
                [in] BSTR bstrAppData);
            [propget,
                id(6),
                helpstring("Retrieve the IP address of the other
party in the session."), helpcontext(0)]
            HRESULT RemoteAddress(
                [out, retval] BSTR *pbstrRemoteAddress);
            [propget,
                id(7),
                helpstring("Retrieve session ID."), helpcontext(0)]
            HRESULT SessionID(
                [out, retval] BSTR *pbstrSessionID);
            [propget,
                id(8),
                helpstring("Retrieve the app-specific context data."),
helpcontext(0)]
            HRESULT ContextData(
                [out, retval] BSTR *pbstrData);
            [propget,
                id(9),
                helpstring("Retrieve the application name."),
                helpcontext(0)]
            HRESULT ApplicationName(
                [out, retval] BSTR *pbstrName);
            [propget,
                id(10),
                helpstring("Retrieve the application URL."),
                helpcontext(0)]
            HRESULT ApplicationURL(
                [out, retval] BSTR *pbstrURL);
            [propget,
                id(11),
                helpstring("Retrieve the session flags."),
                helpcontext(0)]
            HRESULT Flags(
                [out, retval] LONG *plFlags);
            [propget,
                id(12),
                helpstring("Retrieve the other user."), helpcontext(0)]
            HRESULT User(
                [out, retval] IDispatch **ppUser);
            [propput,
                id(13),
                helpstring("Set the local IP address of the session."),
helpcontext(0)]
            HRESULT LocalAddress(
                [in] BSTR bstrLocalAddress);
            [propget,
                id(13),
                helpstring("Retrieve the local IP address of the
                session."),
helpcontext(0)]
            HRESULT LocalAddress(
                [out, retval] BSTR *pbstrLocalAddress);
            [id(14),
                helpstring("Send app-specific context data."),
helpcontext(0)]
            HRESULT SendContextData(
                [in] BSTR bstrData);
        }
        //------------------------------------------------------------------
        // DMsgrSessionEvents Interface
        [
            uuid(1847A74F-2E7F-43af-B7F9-55A4DE3276F5),    //
DIID_DMsgrSessionEvents
            helpstring("Messenger Events for Session Interface")
        ]
        dispinterface DMsgrSessionEvents
        {
            properties:
            methods:
            [id(DISPID_ONSTATECHANGED),
                helpstring("The session state has changed from
                    prevState."),
helpcontext(0)]
                void OnStateChanged(
                    [in] SESSION_STATE prevState);
            [id(DISPID_ONAPPNOTPRESENT),
                helpstring("The app for the invitation is not
                    present."),
helpcontext(0)]
                void OnAppNotPresent(
                    [in] BSTR bstrAppName,
                    [in] BSTR bstrAppURL);
            [id(DISPID_ONACCEPTED),
                helpstring("The invitee has accepted the
                    invitation."),
helpcontext(0)]
                void OnAccepted([in] BSTR bstrAppData);
            [id(DISPID_ONDECLINED),
                helpstring("The invitee has declined the
                    invitation."),
helpcontext(0)]
                void OnDeclined([in] BSTR bstrAppData);
            [id(DISPID_ONCANCELLED),
                helpstring("The session has been cancelled."),
helpcontext(0)]
                void OnCancelled([in] BSTR bstrAppData);
            [id(DISPID_ONTERMINATION),
                helpstring("The session has ended."), helpcontext(0)]
                void OnTermination(
                    [in] long hr,
                    [in] BSTR bstrAppData);
            [id(DISPID_ONREADYTOLAUNCH),
                helpstring("The session is approved for launch."),
helpcontext(0)]
                void OnReadyToLaunch( );
            [id(DISPID_BEFOREAPPLAUNCH),
                helpstring("The session's application is about to be
launched."), helpcontext(0)]
                void BeforeAppLaunch([in, out] VARIANT_BOOL
*pfEnableDefault);
            [id(DISPID_ONCONTEXTDATA),
                helpstring("New context data has arrived."),
                helpcontext(0)]
                void OnContextData(
                    [in] BSTR bstrContextData);
            [id(DISPID_ONSENDERROR),
                helpstring("The last operation failed
                    when sending."),
helpcontext(0)]
                void OnSendError(
                    [in] long hr);
        }
        //------------------------------------------------------------------
        // Messenger session manager class definition
        [
            uuid(E3A3B1D9-5675-43c0-BF04-37BE12239FB7),    //
CLSID_MsgrSessionManager
            helpstring("Messenger Session Manager Object")
        ]
        coclass MsgrSessionManager
        {
            [default] interface IMsgrSessionManager;
            [default, source] dispinterface
            DMsgrSessionManagerEvents;
        };
```

The exemplary SIAPI 112 of TABLE 1 and objects that implement them are also documented in a Messenger Service API Reference file that can be downloaded from the following Web site: http://download.microsoft.com/download/windowsmessenger/Install/4.6/WIN98M eXP/EN-US/Messenger.exe, and which is hereby incorporated by reference.

Session Invite Application 110 Registration

An installed application 110 registers itself with a messenger platform client 108. For instance, application 110-1 registers with its respective messenger platform client 108-1. Application registration information 128 of FIG. 1 includes, for example, a GUID, a Universal Resource Identifier (URI), a path, and an application 110 name—each respectively represented by registration data 128 of FIG. 1. The GUID is a key identifier for the application 110 that is substantially unique as compared to other identifiers for other applications 110. The other three values are the strings that identify the key. The URI identifies a server that hosts a download site (e.g., the database 134 of FIG. 1) from which a user can retrieve the application 110. In one implementation, an application 110 identifies its own download site(s) when installed onto a device 106. The path is an absolute or relative path of the application 110 to be executed. The application name is used as an identifier for the application. The key can be stored in a portion of an operating system's registry information.

Once an SIAPI enabled application 110 registers with the messenger platform 108, the messenger 108 adds menu items and buttons to one or more of the application's windows so that an end-user can initiate a peer-to-peer session using user interface (UI) elements of the client application 110. In other words, by registering an application 110, a user/device 106 can invite other users/devices 106 to participate (e.g., accept) in a peer-to-peer session with the registered application 110 from an invite menu, dialog box, command line, or other user interface. In this example, the messenger platform client 108 provides a list of registered applications 110 to a requesting application 110. Additionally, application 110 registration allows other applications 110 to programmatically/automatically (i.e., with or without user interaction) (a) identify registered application(s) as being peer-to-peer session capable, and (b) initiate a peer-to-peer session with the registered application.

Launching Peer-to-Peer Communications

Devices 106 that are already communicating through respective messenger clients 108-1 and 108-2 can arrange a peer-to-peer session between various combinations of applications 108 and/or 110 by performing the following operations. Registering the SIAPI application 110 with the messenger platform client 108 enables the application to participate in peer-to-peer session invites. Indicating, programmatically or otherwise (e.g., a dialog box, command line, interacting with user interface controls added to the application window responsive to application registration, etc.) by the inviter, the particular registered application 110 to be used in the session invitation.

Next, programmatically or otherwise (e.g., a dialog box, command line, etc.) the inviter indicates an invitee or device 106 to receive the session invitation. The potential invitees are provided by the client platform messaging module's 108 presence information. Next, a session object 122 is generated at the invitee 106 by the messenger platform 108 to manage both inviter and invitee session specific information. For instance, the session object 122 listens for incoming messages and interprets them to see if they pertain to the given session; if so, then it will send events out to handlers that are listening for events for the given session. To facilitate these actions, the session objects 122 stores session data 126

Session data 126 includes, for example, inviter and invitee sign-in names, respective inviter and invitee device 106 network addresses, a download location (e.g., a URL) for the selected application 110, and other registration data 128 (e.g., the GUID, etc.). In one implementation, a download location is obtained by the inviter device 106 from a registry. Hereinafter, session data is often referred to as "context data".

Inviter and the invitee applications 110 may represent same applications or different applications. For example, the inviter application may be a spreadsheet application and the invitee application may be a work processor application. The various combinations of possible inviter and invitee applications that may engage in a peer-to-peer session via SIAPI 112 are virtually unlimited in number.

A client 106 can arrange any number of peer-to-peer sessions, thus there can be any number of session objects 122 to manage arranged sessions. A new session object 122 is created each time an invitation 126 is generated and communicated to another client 106. TABLE 2 shows an example of how to create a session object—"MsgrSessionManager object".

TABLE 2

Exemplary Session Object Generation

'MsgrSessionManager object.
Public WithEvents MsgrSSM As MessengerPrivate.MsgrSessionManager
'MsgrSession object.
Public WithEvents MsgrSession As MessengerPrivate.MsgrSession
'Create the session object.
Set MsgrSession = MsgrSSM.CreateSession
'Upon creating the session, the State property changes and a
SessionID property is created. The state property takes the format of
{XXXXXXXX-XXXX-XXXX-XXXX-XXXXXXXXXXXX} and can
be one of multiple possible SESSION_STATE values.
The following refers to the preceding code snippet and demonstrates how
to access the SessionID and State properties.
'Retrieve the SessionID of the Session object.
MsgBox "Session ID: " & MsgrSession.SessionID
'Retrieve the State of the Session object.
MsgBox "State: " & MsgrSession. State Peer-to-peer session invitation 126, which includes the session object 122, is communicated to the invitee device 106 via relay server 102. The specific application 110 that is going to be involved in the session can, for example, supply portions of invite text displayed at the invitee device 106. TABLE 3 shows an exemplary set of code to communicate a session invitation 126 to an invitee device 106.

TABLE 3

EXAMPLE OF A SESSION INVITE

Private Sub InviteMember( )
    '1. Create a context data variable to be used.
    '2. Create and assign a value for the sign-in name to a
    variable.
    '3. Create and assign a value for the ServiceID of the
    user to be invited.
    '4. Set the MsgrContact object to the variables created
    in actions 2 and 3.
    Set MsgrContact = Nothing
    'Set MsgrContact to the variables created for steps
    2 and 3.
    Set MsgrContact = MsgrUIA.GetContact(strSigninName,
    strServiceID)
    'Set the GUID of the application to be used for the
    session. For this
  example, NetMeeting.

TABLE 3-continued

EXAMPLE OF A SESSION INVITE

```
    MsgrSession.Application    =    "{44BBA842-CC51-
11CF-AAFA-00AA00B6015C}"
        'Invites user to the session with the context data
        created in step 1.
        MsgrSession.Invite MsgrContact, strContextAppData
        MsgBox "Sending NetMeeting Invitation to = " &
    CStr(MsgrContact.SigninName)
End Sub
```

A session invite involves at least two (2) devices 106, a session inviting or "inviter" device and a device being invited to participate in the session, the invitee device. The intermediate messenger client platform module 108, which is hosted by the target device, facilitates connection to the application 110 hosted by the target device. Depending on which application 108 or 110 is initiating the session, the target of the session invitation 126 can be the remote messenger platform 108-2 of FIG. 1, or the remote SIAPI enabled application 110-2. For instance, if the peer-to-peer session inviter is the messenger platform 108-1, the invitee is the remote messenger platform 108-2. If the session inviter is the registered SIAPI application 110-1, the invitee is the remote SIAPI enabled application 110-2.

When an application 110-1 (or the messenger 108-1) on the invitee requests an invitation to an invitee or contact device 106-2, the messenger 108-1 encodes the invitation into a special message 126 that gets sent to the invitee device 106-2. All other interactions with the session, such as sending new client-application-specific data or canceling the invitation, are also encoded into special messages that are then sent to the invitee device 106-2. The invitee or target of the session invitation 126 is always remote and depends on what is currently executing on the target device.

Figure 2:
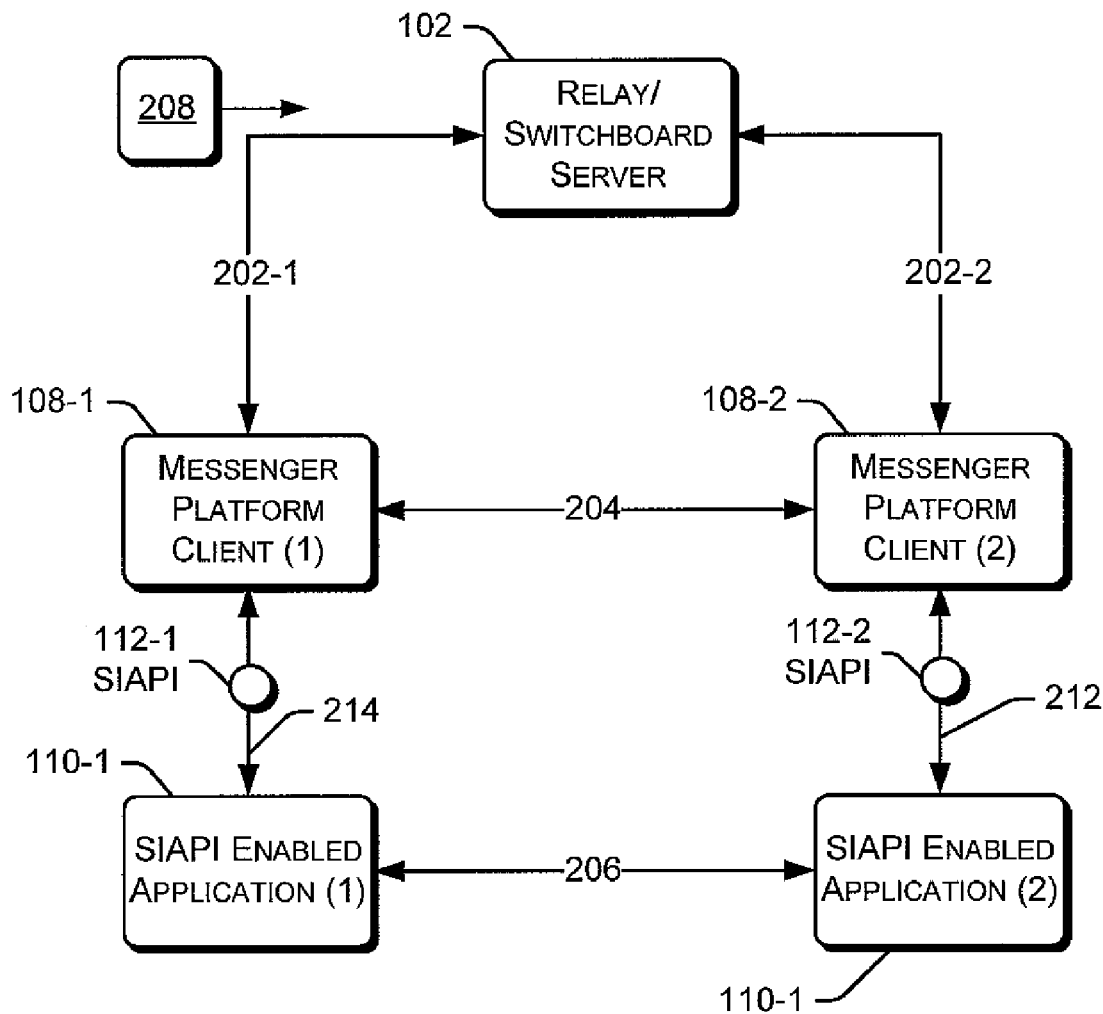
FIG. 2 shows a number of exemplary peer-to-peer communication sessions between Session Invitation (SI) Application Programming Interface (API) enabled applications that are executing on respective inviter and invitee devices.

FIG. 2 shows a number of exemplary peer-to-peer communication sessions. The messenger platforms 108-1 and 108-2 of this example establish a connection over communication path 202 with one another through the relay server 102, thereby allowing establishment, via SIAPI 112, of peer-to-peer sessions between respective platforms 108 and/or between respective applications 110. Such peer-to-peer sessions may be through network 104 or via some other communication path such as a serial cable, infrared connection, etc. Communication paths 204 and 206, which may or may not be bi-directional in nature, represent possible peer-to-peer sessions between respective applications 108 and 110 that are maintained independent of the relay server 102.

For example, messenger clients 108-1 and 108-2, which are in communication with one another, can arrange both respective sides of the following peer-to-peer sessions: (a) the messenger platforms 108-1 and 108-2 as shown by peer-to-peer communication pathway 204; and, (b) applications 110-1 and 110-2 as shown by peer-to-peer communication pathway 206-this session is arranged via the exposed SIAPI interfaces 112.

For purposes of this discussion, device 106-1 is shown as the inviter device. When an application 110-1 (or the messenger 108-1) on the inviter device 106-1 requests an invitation to an invitee or contact device 106-2, the inviter's messenger platform 108-1 encodes the invitation into a session invite message (e.g. session invite message126 of FIG. 1) that gets sent to the invitee device 106-2 as one or more electronic files 208. All other interactions with the session, such as sending new client-application-specific data or canceling the invitation, are also encoded into special messages that are then sent as one or more electronic files 208 to the invitee device 106-2. The invitee or target of the session invitation 126 is always remote.

Referring to FIG. 1, responsive to receiving a session invitation, the invitee's messenger platform module generates a local session object 122 to handle all of the operations to arrange the particular peer-to-peer session, and allows the user/invitee device to accept or decline the session invitation 126. Responding to the invitation can be done programmatically or via a dialog box, command line, and so on. For instance, if no client invitee application event handler handles the received invitation, the invitee messenger 108 will show a message to the end user that can be used by the end user to accept or decline the peer-to-peer session invitation.

If the invitee/recipient declines or cancels the received session invitation, the response is communicated back to the inviter's application 108 or 110 and the requested session is terminated. Otherwise, if the target application is an SIAPI enabled application 110, the invitee's messenger client platform 108 confirms that the application 110 is installed on the invitee's device 106. If the application 110 is not installed on the invitee's device 106, the invitee's messenger client platform 108 declines the session invitation and launches a Web browser (e.g., Microsoft® Internet Explorer, Netscape Navigator, or the like) such that it is directed 112 to a site indicated in the session invite 126 from which the recipient can download the application 110.

If the inviter initiated the session with the client device via a registered application 110, (as compared to through the inviter's messenger platform module 108) and the exposed SIAPI 112, then the inviter application is already executing. Otherwise, the inviter's messenger platform module 108 initiated the session and thus, launches the inviter application 110 (if it is not already executing) to communicate corresponding session data 126 to the invitee. At this point, the application 110 is running on both inviter and invitee computers 106 and each application 110 is aware of the specific parameters needed to communicate in a peer-to-peer session with the other respective application 110. In this manner, the instant messaging components of system 100 have arranged peer-to-peer communications between different applications 110.

Accordingly, SIAPI 112 allows an application 110 that is not a messenger platform application to programmatically communicate an invitation through an instant messaging service (a combination of platform application 108 and relay server 102) to arrange into a peer-to-peer session with any other SIAPI enabled application 110.

An Exemplary Procedure to Exchange Peer-to-Peer Session Information

Figure 3:
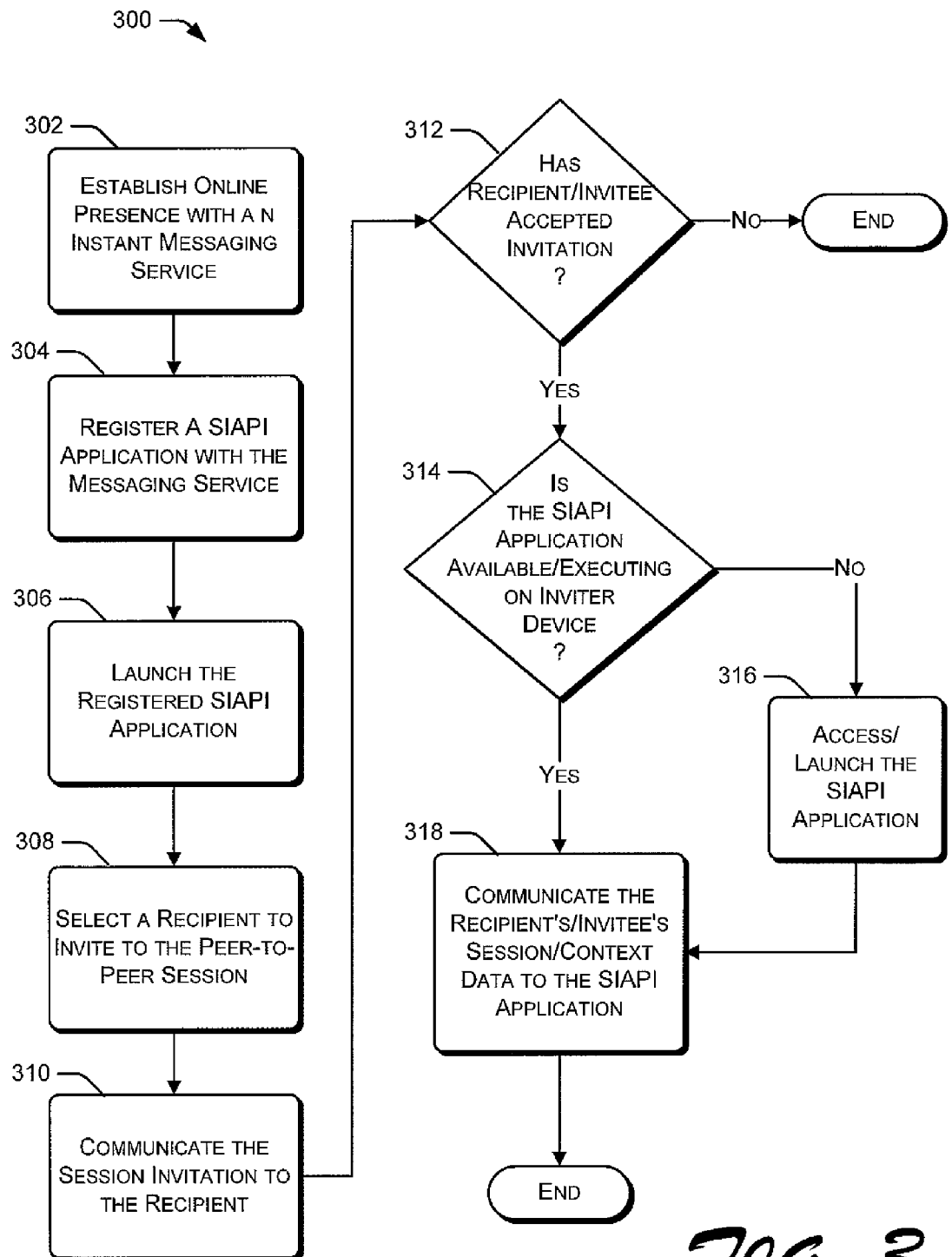
FIG. 3 shows an exemplary procedure using an instant messenger service to arrange a peer-to-peer session between applications.

FIG. 3 shows an exemplary procedure 300 to initiate a peer-to-peer session via an instant messenger service. For purposes of discussion, operations of procedure 300 are described in reference to components of system 100 of FIG. 1. At block 302 at least first and second client devices 106, via respective messaging client platform objects 108, establish online presence with an instant messaging service relay server 102. The messaging client platform objects 108 implement and expose a SIAPI 112 for one or more applications to arrange peer-to-peer sessions with other respective applications.

At block 304, an SIAPI 112 enabled application 110, which is hosted by the first client device 106, is registered with the messaging service. Such registration may be performed by the application 110 or by some other application such as by an install program during application 110 install operations. For purposes of this discussion, the registered application is referred to as the inviter application. At block 306, the inviter application is selected or launched. This can be accomplished in a number of ways such as via a shortcut, a drop down menu or dialog box provided by a messenger client application 108, and so on.

At block 308, the inviter application leverages instant messaging service presence information to select, with or without user intervention, an invitee application 110. At block 310, a session invitation 126 including, for example, the network address of the client device 106 that is hosting the inviter application, and/or other data is communicated as one or more electronic files 136 to a messenger client platform module 108 executing at an invitee device 106. Such other data includes, for example, session specific data and registration data 128. In one implementation, methods of the "IMsgrSession" object of TABLE 1 are used to communicate session invitation(s), acceptance(s), and decline(s) between target platforms.

At block 312, the inviter determines via respective IMsgrSession based messages whether the invitee has accepted or declined the invitation to engage in a peer-to-peer session with the inviter If the invitation to engage has been declined, the procedure 300 ends, and the requested peer-to-peer session is not established.

In one implementation discussed in greater detail below in reference FIG. 4, a session non-acceptance response may indicate that the invitee device 106 is in the process of downloading or attempting to download the session target SIAPI enabled application 110 from a remote site (e.g., identified via a session data 126 provided URI). The request to engage in a peer-to-peer session between the inviter and the target application may subsequently be accepted by a messenger platform responsive to successful download of the session target application 110.

At block 314, the invitation to engage in the peer-to-peer session has been accepted by the invitee. The inviter messenger platform 108 determines whether an instance of the SIAPI enabled application 110 (identified in the context data communicated to the invitee device 106 (block 310)) is executing on the inviter device 106. At block 316 it has been determined that the target application 110 is either available but not executing on the inviter device 106 or presently not loaded on one or more storage media coupled to the inviter device 106. If the target application 110 is available, block 316 operations launch the application. Otherwise, block 316 operations download, install, and then execute the application 110.

At block 318, session context data 126 is communicated to the executing application 110 on the inviter device 106. If the application 110 was already available and executing on the inviter device 106, block 318 of procedure 300 can be executed at any time immediately before or after the operation of communicating session information to the recipient (block 310). A set of exemplary operations to communicate data using an exemplary SIAPI 112 to arrange a peer-to-peer session are shown above in TABLE 1 and below in reference to APPENDIX A.

Figure 4:
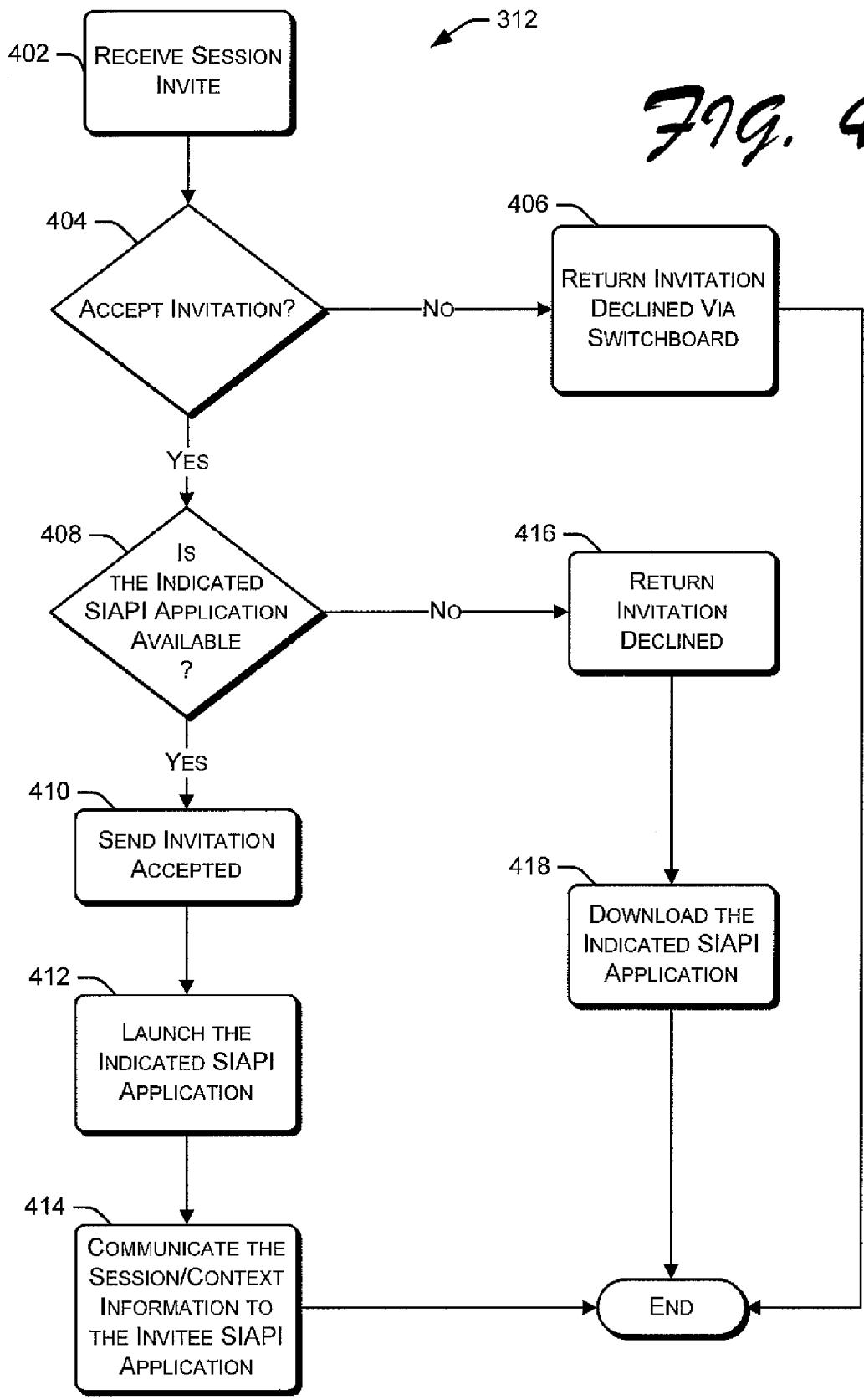
FIG. 4 shows further aspects of the exemplary procedure of FIG. 3. More particularly.

FIG. 4 shows further aspects of an exemplary procedure 300 to initiate peer-to-peer sessions between networked applications. More particularly, FIG. 4 illustrates further aspects of block 312 of FIG. 3. Operations exemplified by blocks 402 through 418 are performed by the invitee device 106 responsive to receiving a session invite message 126 from an inviter messenger platform 108. For purposes of discussion, operations of FIG. 4 are described in reference to components of FIG. 1.

At block 402, the invitee device 102/messenger client platform 108 receives a session invitation 126 to arrange a peer-to-peer session with an indicated application 108 or 110. At block 404, a user of the invitee device 106 indicates whether the received invitation is accepted (e.g., via a dialog box response, command line, etc.). At block 406, the session invitation having been declined, the invitee's message platform client 108 communicates a session invitation declined message as one or more electronic files 138 to the inviter 108. At this point, procedure 300 ends Otherwise, the session invite message having been accepted by the user, at block 408, the invitee messenger platform 108 determines whether the target SIAPI application 110 is available for execution. An SIAPI application 110 is available for execution if it is loaded or otherwise stored in non-volatile or volatile RAM comprising the invitee device 106.

If the target application 110 is not available, operations of block 416, communicate a session invite declined response as one or more electronic files 138 to the inviter device 106. At block 418, the invitee messenger platform client 108 attempts to download the SIAPI application from a network address supplied in the received session invitation (block 402). At this point, procedure 300 ends.

Otherwise, if block 408 operations determine that the target application 110 is available, block 410 operations communicate a session invite acceptance response as one or more electronic files 138 to the inviter device 106. The invitee device 102 launches the available SIAPI application 110 at block 412. At block 414, the invitee device 102 communicates corresponding session context information (e.g. a combination of some portion of the session data 126 and the registration data 128 of FIG. 1) received in the session invitation 126 (block 402). In this example, the communicated session context information is represented as one or more electronic files 138.

At this point, respective SIAPI enabled applications 110 are executing at respective inviter and invitee devices 106. Each executing application has utilized communicated session context information (e.g., network address data and network protocol information) to configure itself to communicate with the other application 110 over a corresponding peer-to-peer connection 132. The peer-to-peer connection 132 and corresponding application 110 communications are now functionally independent of the instant messaging service components that initially facilitated configuration of the peer-to-peer communications between the two applications 110.

Although not shown in FIGS. 3 and 4, messaging client platform applications 108 may also utilize presence information of the instant messaging system 100, of which they both respectively play a part, to engage in peer-to-peer communications with one another independent of the relay server 102. In this manner, the instant messaging components of system 100 have arranged peer-to-peer communications between different applications 110 or between respective instant messaging components 108 themselves.

An Exemplary Computing Environment

Figure 5:
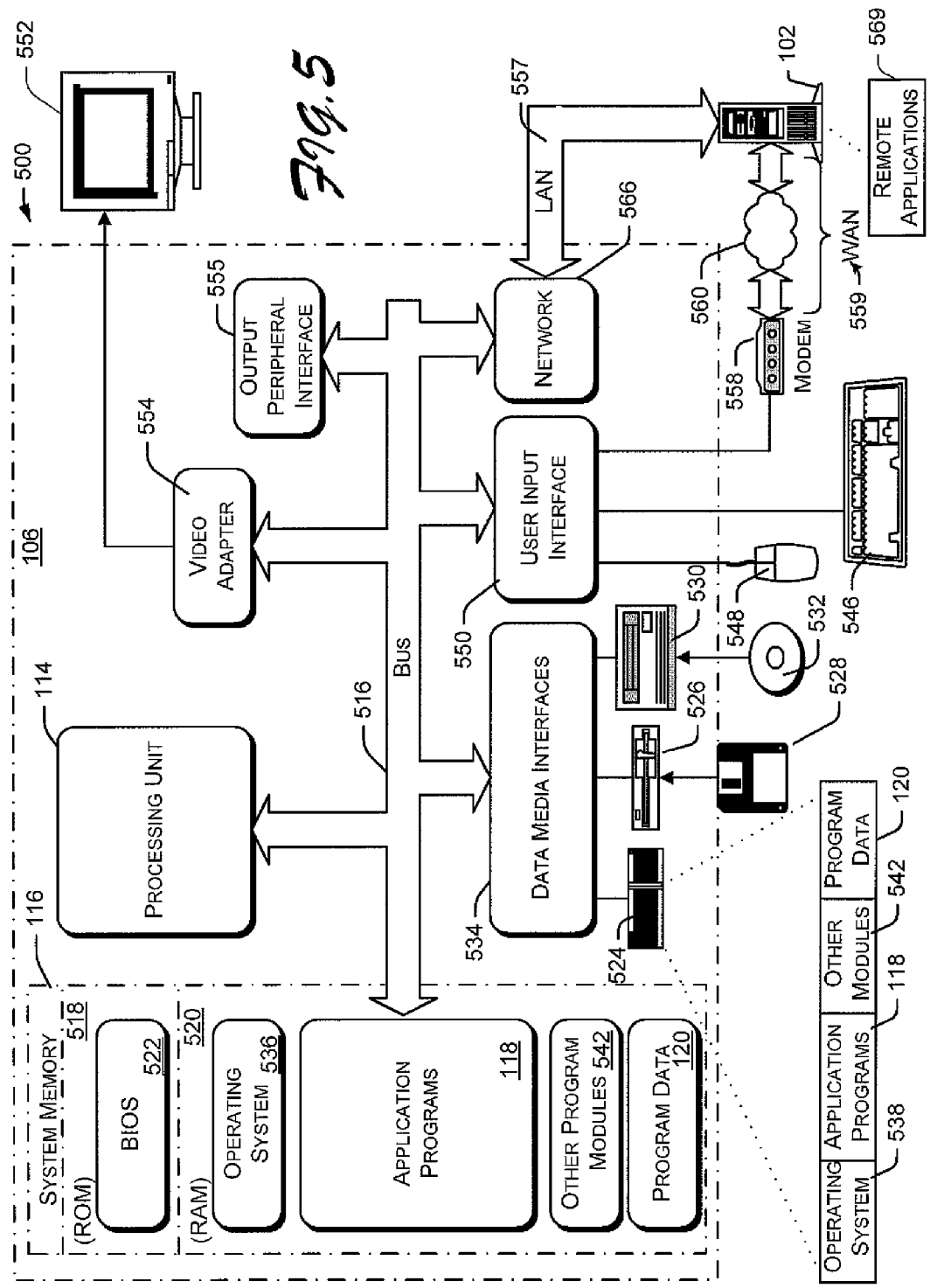
FIG. 5 shows an example of a suitable computing environment 500 on which an exemplary system and procedure using an instant messaging service to arrange a peer-to-peer communication session between networked applications may be implemented.

FIG. 5 shows an example of a suitable computing environment 500 on which an exemplary system and procedure using an instant messaging service to arrange a peer-to-peer communication session between networked applications may be implemented. Exemplary computing environment 500 is only one example of a suitable computing environment and is not intended to suggest any limitation as to the scope of use or functionality of an exemplary system and procedure to cluster queries. The computing environment 500 should not be interpreted as having any dependency or requirement relating to any one or combination of components illustrated in the exemplary computing environment 500.

An exemplary system and procedure using an instant messaging service to arrange a peer-to-peer communication session between networked applications may be described in the general context of computer-executable instructions, such as program modules, being executed by a computer. Generally, program modules include routines, programs, objects, components, data structures, etc., that perform particular tasks or implement particular abstract data types. An exemplary system and procedure to arrange a peer-to-peer session may also be practiced in distributed computing environments where tasks are performed by remote processing devices that are linked through a communications network. In a distributed computing environment, program modules may be located in both local and remote computer storage media including memory storage devices.

As shown in FIG. 5, the computing environment 500 includes a general-purpose computing device in the form of inviter and invitee computing devices 106. For purposes of this discussion, exemplary aspects of inviter and invitee computing devices are described in reference to the computing device 106, unless otherwise indicated. Respective inviter and invitee computers 106 may include some portion or all of the elements and features described herein relative to computer 106. The components of computer 106 may include, by are not limited to, one or more processors or processing units 114, a system memory 116, and a bus 516 that couples various system components including the system memory 116 to the processor 114.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 106 typically includes a variety of computer-readable media. Such media may be any available media that is accessible by the computer 106, and it includes both volatile and non-volatile media, removable and non-removable media. For example, the system memory 116 includes computer readable media in the form of volatile memory, such as random access memory (RAM) 520, and/or non-volatile memory, such as read only memory (ROM) 518. A basic input/output system (BIOS) 522, containing the basic routines that help to transfer information between elements within computer 106, such as during start-up, is stored in ROM 518. RAM 520 typically contains data and/or program modules that are immediately accessible to and/or presently be operated on by processor 114.

Computer 106 may further include other removable/non-removable, volatile/non-volatile computer storage media. By way of example only, FIG. 5 illustrates a hard disk drive 524 for reading from and writing to a non-removable, non-volatile magnetic media (not shown and typically called a "hard drive"), a magnetic disk drive 526 for reading from and writing to a removable, non-volatile magnetic disk 528 (e.g., a "floppy disk"), and an optical disk drive 530 for reading from or writing to a removable, non-volatile optical disk 532 such as a CD-ROM, DVD-ROM or other optical media. The hard disk drive 524, magnetic disk drive 526, and optical disk drive 530 are each connected to bus 516 by one or more interfaces 534.

The drives and their associated computer-readable media provide nonvolatile storage of computer readable instructions, data structures, program modules, and other data for computer 106. Although the exemplary environment described herein employs a hard disk, a removable magnetic disk 528 and a removable optical disk 532, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 528, optical disk 532, ROM 518, or RAM 520, including, by way of example, and not limitation, an OS 538, one or more application programs 118, other program modules 542, and program data 120. Each such OS 538, one or more application programs 118, other program modules 542, and program data 120 (or some combination thereof) may include an embodiment of an exemplary system and procedure to arrange peer-to-peer communication sessions.

A user may enter commands and information into computer 106 through input devices such as keyboard 546 and pointing device 548 (such as a "mouse"). Other input devices (not shown) may include a microphone, joystick, game pad, satellite dish, serial port, scanner, or the like. These and other input devices are connected to the processing unit 114 through a user input interface 550 that is coupled to bus 516, but may be connected by other interface and bus structures, such as a parallel port, game port, or a universal serial bus (USB).

A monitor 552 or other type of display device is also connected to bus 516 via an interface, such as a video adapter 554. In addition to the monitor, personal computers typically include other peripheral output devices (not shown), such as speakers and printers, which may be connected through output peripheral interface 555.

Computer 106 operates in a networked environment using logical connections any number of other remote computers 106, as well as to a relay server 102. Logical connections shown in FIG. 5 are a local area network (LAN) 557 and a general wide area network (WAN) 559. Such networking environments are commonplace in offices, enterprise-wide computer networks, intranets, and the Internet. Remote computer 102 may include many or all of the elements and features described herein relative to computer 106.

When used in a LAN networking environment, a computer 106 is connected to LAN 557 via network interface or adapter 566. When used in a WAN networking environment, a computer typically includes a modem 558 or other means for establishing communications over the WAN 559. The modem 558, which may be internal or external, may be connected to the system bus 516 via the user input interface 550 or other appropriate mechanism.

Depicted in FIG. 5 is a specific implementation of a WAN via the Internet. Computer 106 typically includes a modem 558 or other means for establishing communications over the Internet 560. Modem 558, which may be internal or external, is connected to bus 516 via interface 550.

In a networked environment, program modules depicted relative to the personal computer 106, or portions thereof, may be stored in a remote memory storage device. By way of example, and not limitation, FIG. 5 illustrates remote application programs 569 as residing on a memory device of remote computer 102. The network connections shown and described are exemplary and other means of establishing a communications link between the computers may be used.

Computer Readable Media

An implementation of exemplary subject matter using an instant messaging service to arrange a peer-to-peer communication session between networked applications may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, and program modules. Communication media also includes any information delivery media.

CONCLUSION

The described arrangements and procedures provide an instant messaging service to arrange a peer-to-peer communication session between networked applications. Although the arrangements and systems using an instant messaging service to arrange a peer-to-peer communication session between networked applications have been described in language specific to structural features and methodological operations, it is to be understood that the arrangements and procedures as defined the appended claims are not necessarily limited to the specific features or operations described. Rather, the specific features and operations are disclosed as preferred forms of implementing the claimed subject matter.

APPENDIX – A
Exemplary Operations to Communicate Data using an Exemplary SIAPI to Arrange a Peer-to-Peer Session
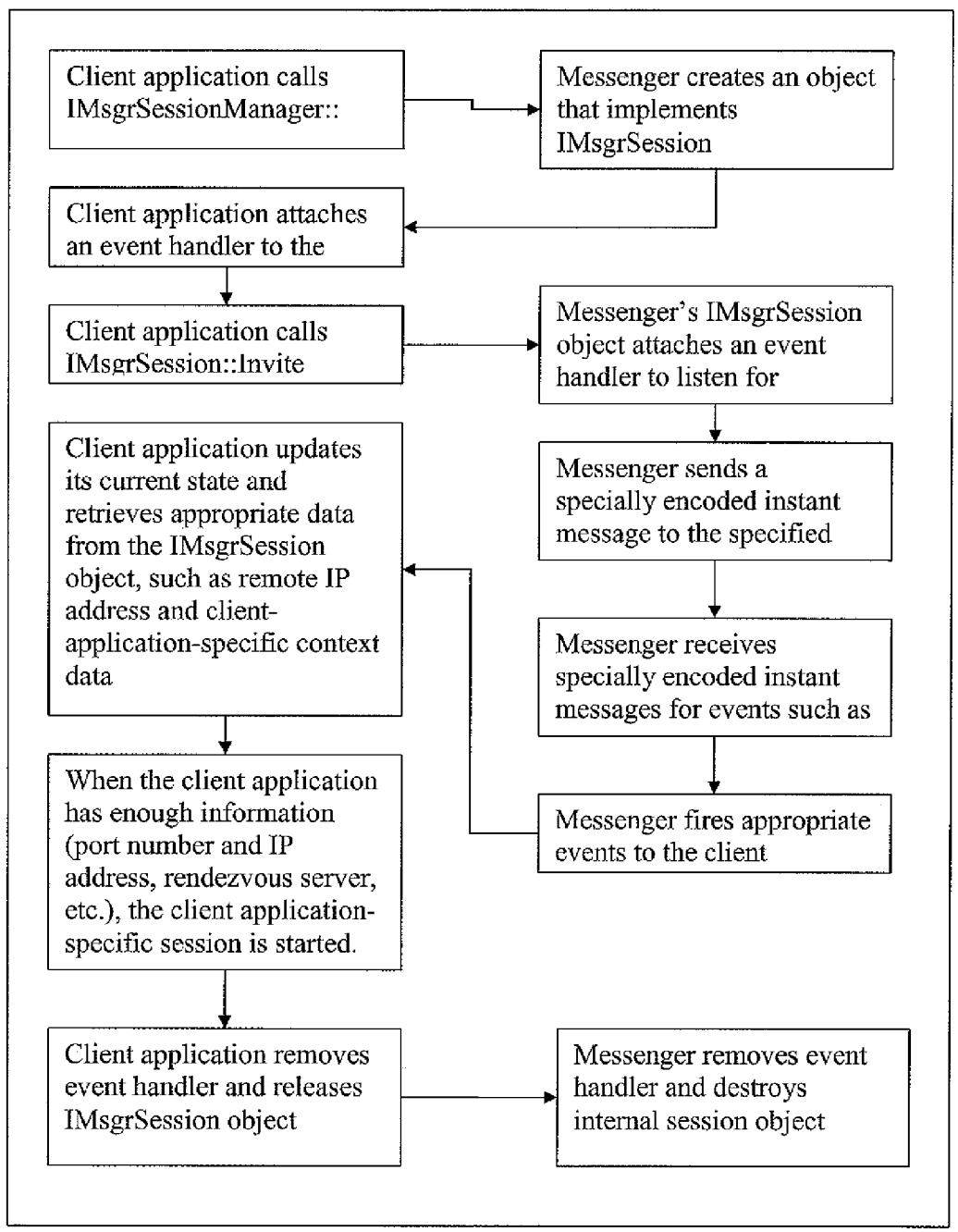

APPENDIX – A
Exemplary Operations to Communicate Data using an Exemplary SIAPI to Arrange a Peer-to-Peer Session
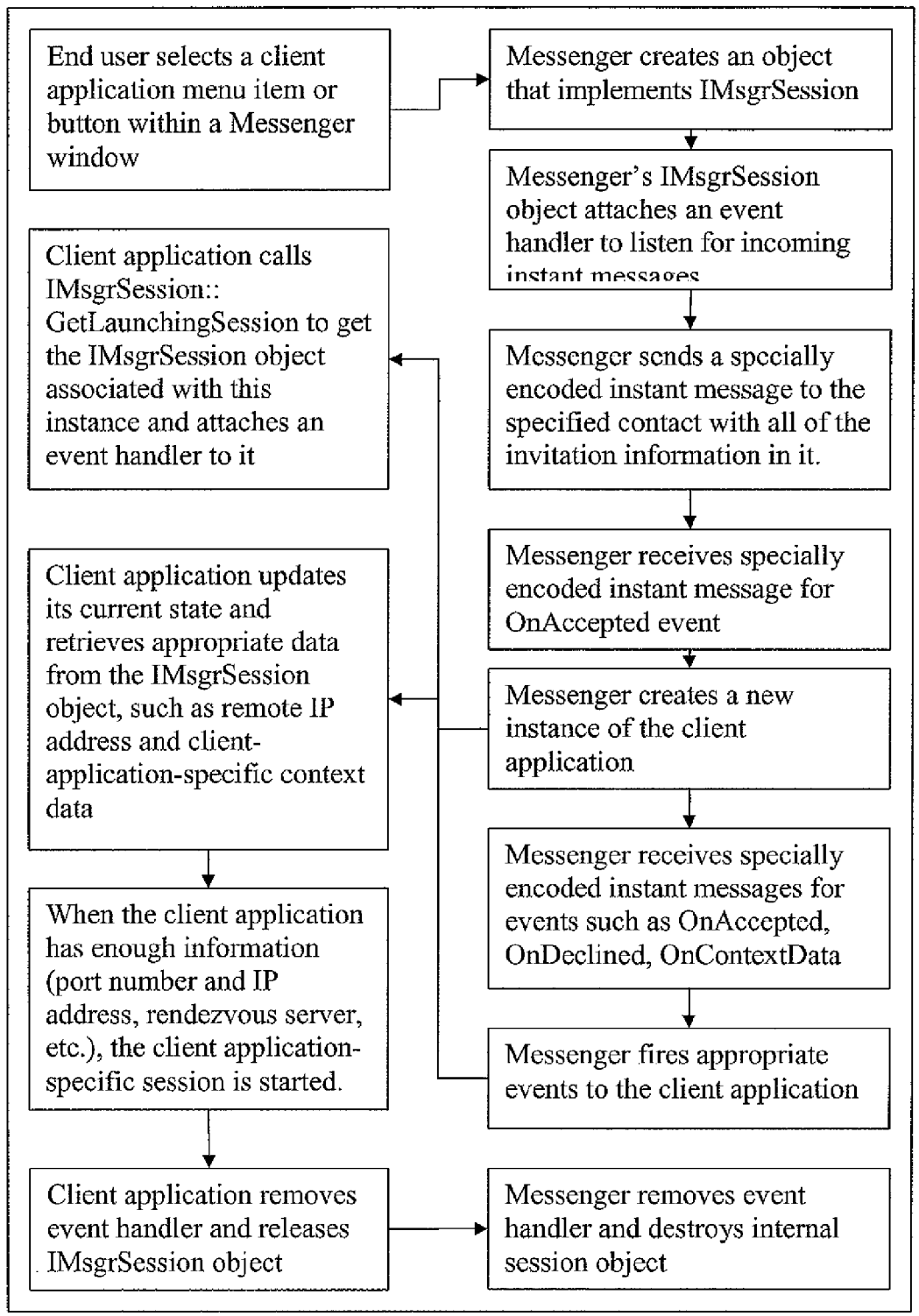

APPENDIX – A
Exemplary Operations to Communicate Data using an Exemplary SIAPI to Arrange a Peer-to-Peer Session
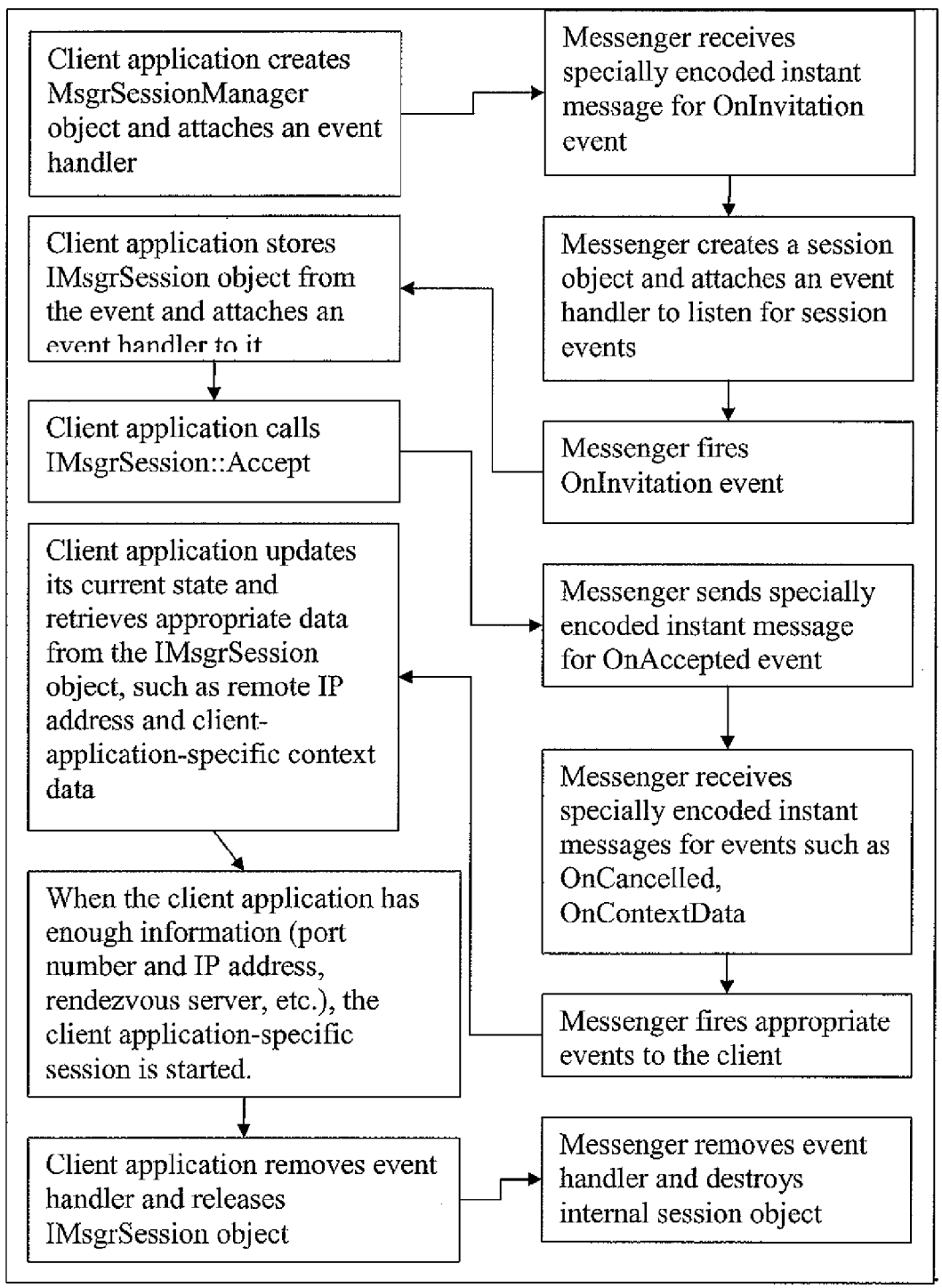

APPENDIX – A
Exemplary Operations to Communicate Data using an Exemplary SIAPI to Arrange a Peer-to-Peer Session
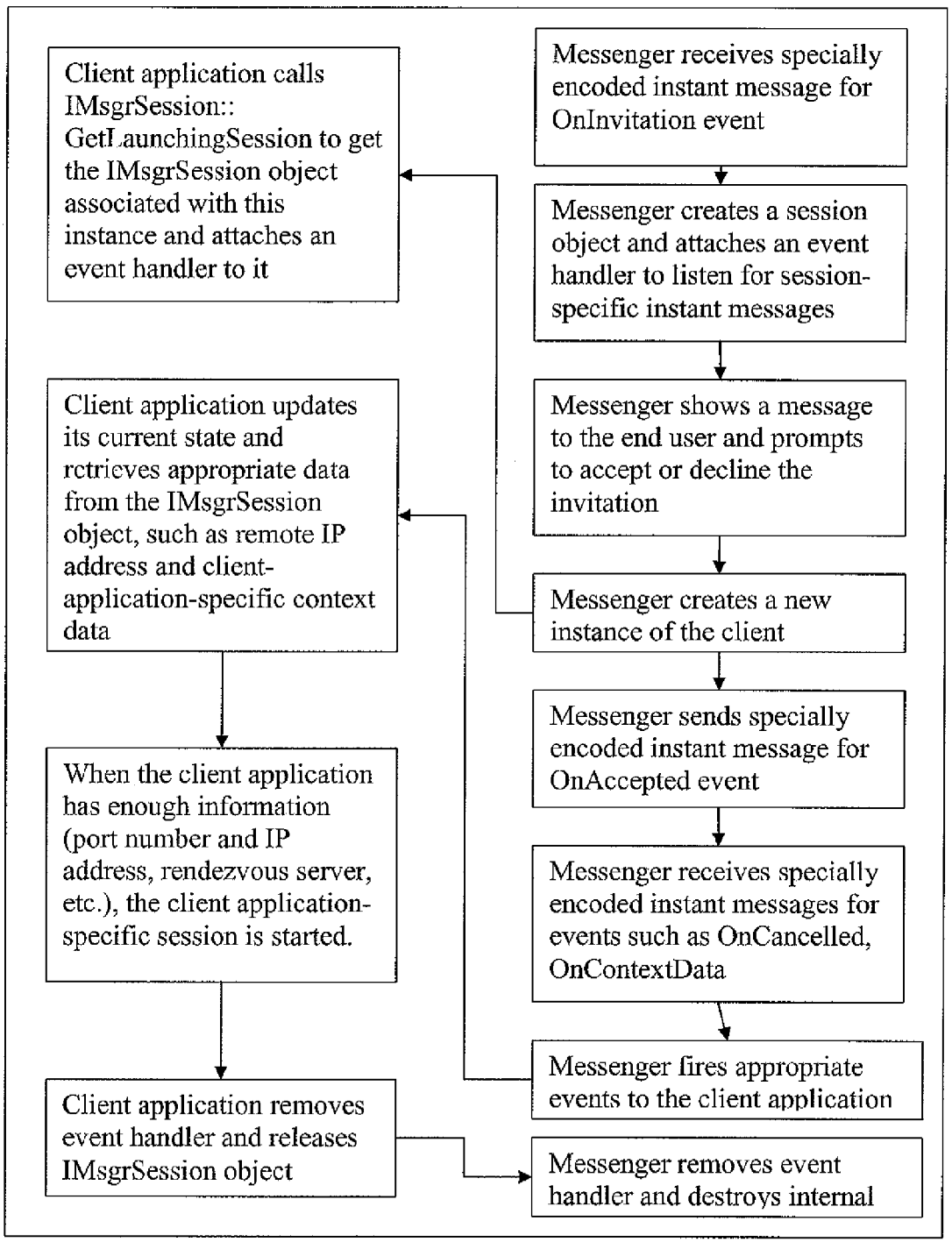

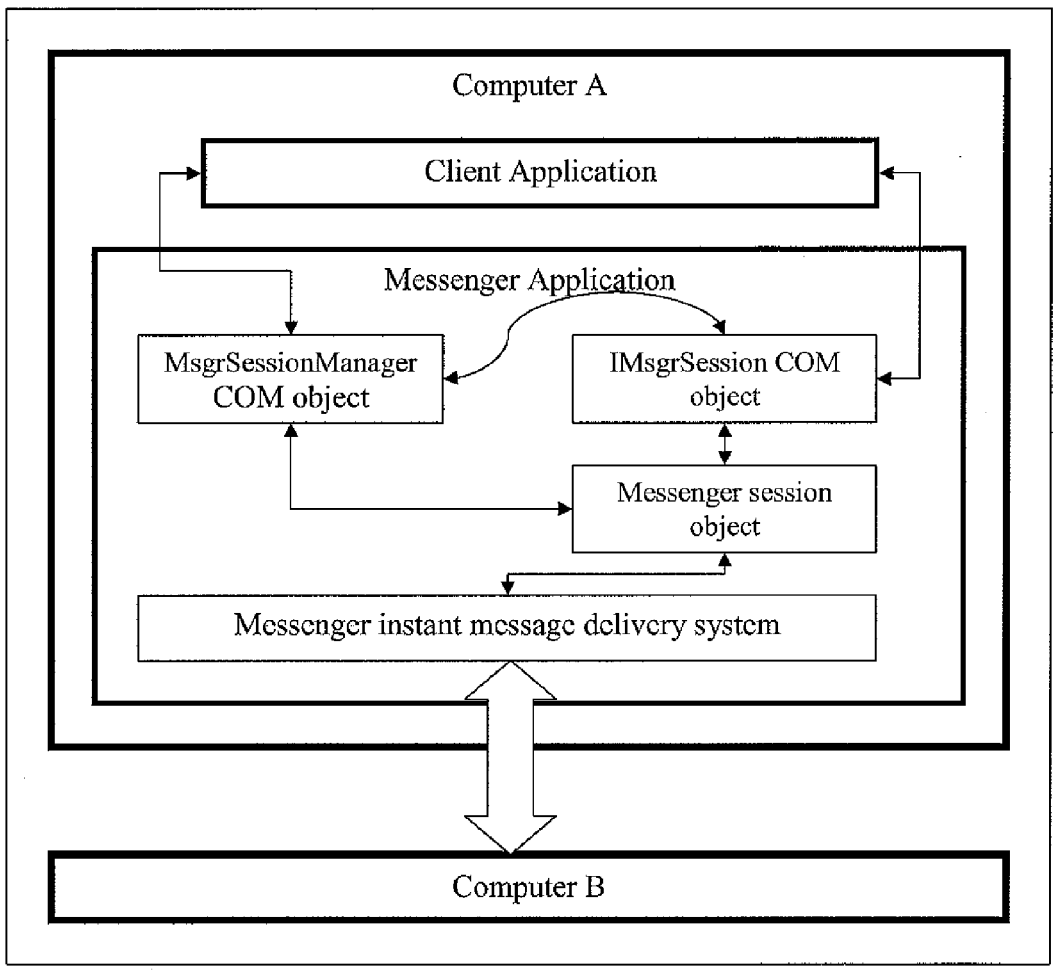

The invention claimed is:

1. A computer-implemented method comprising:
   processing on a processor the computer implemented method;
   storing on a computer readable storage medium computer-executable instructions that, when executed by the processor, performs the computer implemented method;
   selecting a first application associated with a first device to participate in a peer-to-peer communication session;
   inviting a second application associated with a second device to participate in a peer-to-peer communication session with the first application;
   arranging a peer-to-peer communication session between the second application and a third application associated with the first device;
   wherein selecting the first application and inviting the second application are performed based on session invite information coordinated by an instant messaging service, whereby the selecting and inviting facilitates arranging peer-to-peer communications between first and second applications;
   wherein arranging the peer-to-peer communication session between the second application and the third application comprises coordinating, by the first application, the peer-to-peer communication session via a fourth application associated with the second device;
   wherein the second and third applications are not client platforms of the instant messaging service, and the first and fourth applications are respective client platforms of the instant messaging service.

2. A computer-implemented method as recited in claim 1, wherein selecting the first application and inviting the second application are performed independent of whether the first or second applications are respectively executing on the first or second devices.

3. A computer-implemented method as recited in claim 1, wherein inviting the second application to participate in the peer-to-peer communication session is done programmatically or via user interaction with a user interface.

4. A computer-implemented method as recited in claim 1, wherein the computer-executable instructions further comprise instructions for registering an application with the instant messaging service to indicate to a different application that the application is capable of engaging in the peer-to-peer communication session, the first and second applications being registered with the instant messaging service.

5. A computer-implemented method as recited in claim 1, wherein the computer-executable instructions further comprise instructions for:
   registering the first application with the instant messaging service; and
   responsive to registering the first application, adding one or more user interface (UI) components to the first application, the one or more UI components being responsive to user input to initiate the peer-to-peer communication session.

6. A computer-implemented method as recited in claim 1, wherein the computer-executable instructions further comprise instructions for:
   responsive to receiving a peer-to-peer session acceptance message, determining whether the first application is executing at the first device; and
   responsive to determining that the first application is not executing, launching the first application for participation in the peer-to-peer communication session.

7. A computer-implemented method as recited in claim 1, wherein the computer-executable instructions further comprise instructions for:
   responsive to receiving a peer-to-peer session invite message, determining whether the second application is available at the second device; and
   responsive to determining that the second application is not available, downloading the second application from a server coupled to the second device, the server being identified by the session invite message.

8. A computer-implemented method as recited in claim 1, wherein the computer-executable instructions further comprise instructions for:
   responsive to receiving a peer-to-peer session invite message, determining whether the second application is executing at the second device; and
   responsive to determining that the second application is not executing, launching the second application for participation in the peer-to-peer communication session.

9. A computer-implemented method as recited in claim 1, wherein the computer-executable instructions for inviting the second application to participate in the peer-to-peer communication session further comprise instructions for:
   obtaining registration information corresponding to the second application from the instant messaging service; and
   communicating a session invitation message to a messaging client platform associated with the second application, the session invitation message for accepting or declining participation by the second application in the peer-to-peer communication session.

10. A computer-implemented method as recited in claim 1, wherein the computer-executable instructions further comprising instructions for:
    determining an online status of an entity based on presence information provided by the instant messaging service; and
    wherein inviting the second application to participate in the peer-to-peer communication session is performed based on whether the online status indicates that entity is logged into the second device.

11. A device for using an instant messaging service to arrange a peer-to-peer communication session between networked applications the device comprising:
    a processor;
    a memory coupled to the processor, the memory encoded with computer-program instructions executable by the processor, the computer-program instructions for:
    selecting a first application associated with a first device to participate in a peer-to-peer communication session;
    inviting a second application associated with a second device to participate in a peer-to-peer communication session with the first application;
    arranging a peer-to-peer communication session between the second application and a third application associated with the first device;
    wherein selecting the first application and inviting the second application are performed based on session invite information coordinated by an instant messaging service, whereby the selecting and inviting facilitates arranging peer-to-peer communications between first and second applications;
    wherein arranging the peer-to-peer communication session between the second application and the third application comprises coordinating, by the first application, the peer-to-peer communication session via a fourth application associated with the second device;

wherein the second and third applications are not client platforms of the instant messaging service, and the first and fourth applications are respective client platforms of the instant messaging service.

12. A device as recited in claim 11, wherein the first and second applications respectively comprise functionality independent of the instant messaging service.

13. A device as recited in claim 11, wherein the first or second application is a word processor, spreadsheet, e-mail, image processing, Web browser, or other application.

14. A device as recited in claim 11, wherein the computer-program instructions, before instructions for receiving the application identifiers, further comprise instructions for:

registering the second application with the instant messaging service to indicate that the second application implements a session invite interface used by the instant messaging session to arrange the peer-to-peer session; and issuing a request to the instant messaging service to determine peer-to-peer session capable applications that have registered with the instant messaging service.

15. A device as recited in claim 11, wherein the computer-program instructions for arranging the peer-to-peer session further comprise instructions for:

communicating a session invite message to a messaging client platform executing at a device associated with the first or second applications; and responsive to communicating the session invite message, receiving a peer-to-peer session acceptance or decline message from the messaging client platform.

16. A device as recited in claim 11, wherein the computer-program instructions for arranging the peer-to-peer session are performed by first and second messaging client platforms independent of whether the first and/or second application are loaded or executing on corresponding networked devices.

17. A device as recited in claim 11, wherein the computer-program instructions for arranging the peer-to-peer session further comprise instructions for:

determining that the peer-to-peer session has been accepted; and responsive to acceptance of the peer-to-peer session, launching the first and/or second application for participation in the peer-to-peer session.

* * * * *